Jan. 30, 1968 D. C. PRICE 3,365,926
MANUFACTURE OF PLATE METAL PARTS WITH
INTEGRAL THREADED FASTENERS
Filed Nov. 17, 1964 6 Sheets-Sheet 1

INVENTOR.
*Don C. Price*

BY
*Frease, Bishop, Johns & Schick*

ATTORNEYS

INVENTOR.
Don C. Price

INVENTOR.
*Don C. Price*
BY
*Frease, Bishop, Johns & Schick*
ATTORNEYS

Jan. 30, 1968  D. C. PRICE  3,365,926
MANUFACTURE OF PLATE METAL PARTS WITH
INTEGRAL THREADED FASTENERS
Filed Nov. 17, 1964  6 Sheets-Sheet 5

INVENTOR.
*Don C. Price*
BY
*Frease, Bishop, Johns & Schick*
ATTORNEYS

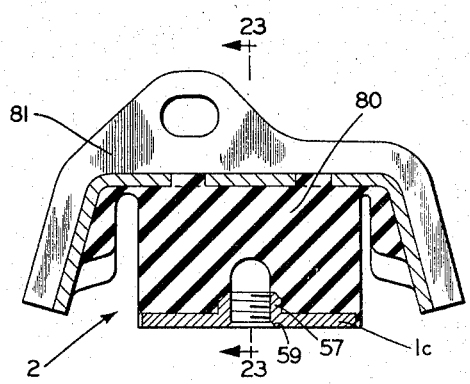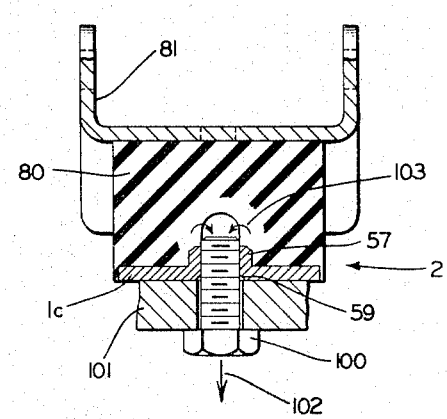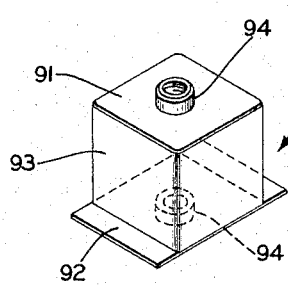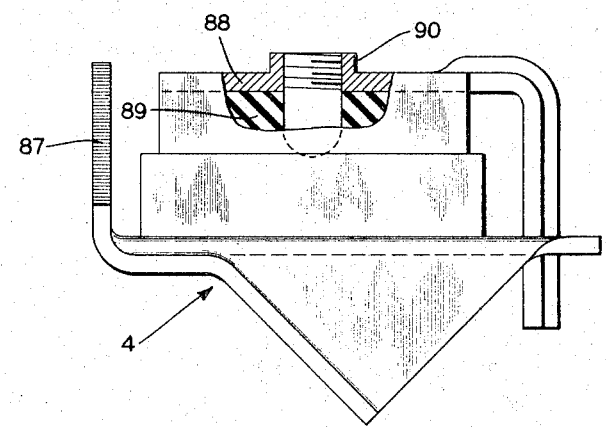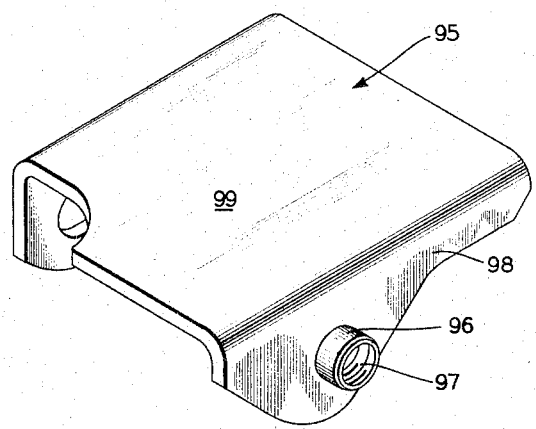

United States Patent Office 3,365,926
Patented Jan. 30, 1968

3,365,926
MANUFACTURE OF PLATE METAL PARTS WITH INTEGRAL THREADED FASTENERS
Don C. Price, Canton, Ohio, assignor to The Monarch Rubber Company, Hartville, Ohio, a corporation of Ohio
Filed Nov. 17, 1964, Ser. No. 411,753
12 Claims. (Cl. 72—370)

ABSTRACT OF THE DISCLOSURE

A plate steel member having a projecting relatively long integral sleeve with concentric sleeve surfaces and a uniform sleeve thickness is made by forming a hole cylindrical throughout its length in a plate blank, extruding a sleeve from metal surrounding the hole under confined compression throughout extrusion flow of the metal, removing the pressure, and then forming a frusto-conical-shaped shoulder between the internal sleeve opening and the top plate surface by further downward applied extrusion pressure which sets the metal in the sleeve.

The sleeve may be threaded with true and undistorted threads having at least 75% full thread profile capable of resisting torque-tension loading without permanent deformation 30% in excess of the strength of threads cut in the same steel and requiring a thicker sleeve wall, by removing a thin skin of work-hardened metal from the inner sleeve surface, and then roll-tapping threads by displacement of metal without metal loss throughout the length of the sleeve in the internal sleeve surface.

The threaded sleeve member may be incorporated as a component of a composite metal-rubber product by molding an extrusion formed sleeve member before threading with and bonding it to rubber, then removing rubber flash from the interior of the sleeve at the same time that the thin skin of work-hardened metal is removed from the inner sleeve surface, and then roll-forming the threads.

---

The invention relates to the manufacture of sheet and plate metal products usually formed to desired shape by bending, stamping, or drawing operations and having one or more internally threaded tubular sleeves, necks, rings or thimbles projecting integrally from one or more surfaces of any such formed product to provide one or more threaded fasteners for such formed product; and more particularly the invention relates to the manufacture of such products as component metal parts of composite assemblies of metal parts permanently connected together in spaced relation by molded rubber.

Composite molded metal-rubber products are used extensively in many fields, such for example, as motor mounts in automotive construction and as mounting pads in the assembly of electrical appliances such as refrigerators. Such composite metal-rubber products usually include at least two metal components or parts joined or bonded together by molded rubber maintaining the metal components spaced apart in desired relation. One or more of the metal parts individually may be desired to be connected to a structural or mounting member by a threaded connection between the part and a threaded bolt. Usually such threaded connection includes a threaded fastener secured in some manner to the sheet metal component of the composite metal-rubber product. This is sometimes accomplished by welding a threaded nut to the sheet metal component. Sometimes the threaded connection is made by driving a self-tapping joint-forming screw or bolt into an opening formed in the sheet metal component.

Difficulties have been encountered in the manufacture or use of each type of threaded fastener or connection. Stamped metal components of automotive motor mounts frequently are formed of 11 to 3 gauge sheet or plate metal, for example, 8 gauge metal which is 0.1719″ thick. The threaded bolt connected to such a sheet metal member for example may have a 7/16″ thread with 14 threads per inch, and 5 to 6 threads in the tapped opening may be the minimum requirements for resisting yielding without a permanent set when the threaded connection is subjected to torque-tension loading which the connection is designed to carry.

Obviously, a self-tapping screw driven into an opening punched in such metal component cannot satisfy such strength requirements for the described threaded connection. Heretofore, it has been sought to resolve the problem by welding a threaded nut, having the required thickness and the required size, shape and number of threads, to the sheet metal component of a composite metal-rubber product, with the threaded nut opening aligned with an opening punched in a wall of the sheet metal component.

However, such expedients raise other problems in addition to the cost of the nut and of the welding operation. If the threaded nut is welded to the composite product after the rubber has been molded, the welding damages adhesion between rubber and metal components in the welded area. On the other hand, if the nut is welded to the sheet metal component before rubber molding, the welded threaded nut or fastener may distort during the rubber molding step. Further, the rubber as well as adhesive material used in bonding the rubber and metal parts together may flow into threaded areas of the nut during rubber molding and subsequently must be removed. This involves a cleaning operation performed by a tap in order to remove foreign material from the nut threads. Such tap-cleaning operation may damage or enlarge the previously cut nut threads and thus may impair the efficiency of the threaded connection.

Various attempts have been made to solve the problems that have existed in the art. A tubular sleeve or thimble was drawn from a sheet or plate metal wall in an attempt to provide for the threaded connection. Such sleeve, particularly where heavy gauge plate metal is involved, has a tendency to develop cracks extending from the open end of the sleeve after deep drawing. This cracking difficulty very materially limits the length of sleeve that can be drawn.

Furthermore, the length of sleeve that may be drawn also is limited by the amount of material available in the drawn circle. The wall thickness of such a drawn sleeve normally is too thin to permit threads with proper thread contour to be tapped in such sleeve by usual thread cutting operations.

Also, close tolerances in respect of the inner and outer sleeve diameters of such a drawn sleeve cannot be maintained, sleeve thickness permitting, to practically allow a proper threaded opening to be tapped in such drawn sleeve. In addition, it is not possible to provide the number of full threads in a drawn sleeve required for many product applications, and particularly when the stamped and drawn metal part is formed from heavy gauge metal.

In instances where self-tapping screws have been driven into such drawn sleeves, required strength of the threaded connection could not be obtained, either because of an insufficient number of engaged threads or an insufficient length of sleeve, or because of non-uniform sleeve thickness, or because of cracking of the drawn sleeve wall.

I have discovered a solution for these long standing and unsolved problems in the art, involving among others a fundamental concept of extruding a tubular neck or sleeve of the desired length and thickness in a wall of a plate metal component of a composite metal-rubber product, and then roll-tapping the extruded sleeve to form an integral threaded fastener for the sheet or plate metal component. The discoveries further involve certain critical controls exercised preceding, during and following the extrusion step, and the concept of performing the extrusion step prior to and of performing the roll-tapping step subsequent to the rubber molding step in the manufacture of composite metal-rubber products.

In accordance with the discoveries and concepts of the invention, substantially no metal loss is involved in forming the integral threaded fastener, only a few operations are required which may be incorporated in stamping operations otherwise used in the manufacture of the stamped sheet or plate metal component, there is no warpage of the threaded fastener portion after threading from any heating because the heating incident to rubber molding the composite metal-rubber product occurs prior to threading, and a high yield of products produced is obtained.

Essential characteristics of the new procedures of the invention involve controlling the character, location and direction of metal flow from the sheet metal blank and in the sleeve being formed as the blank metal and sleeve are subjected to cold working operations under compression in successive stages, the control being such that the metal is relocated in the blank without rupture or fracture of the metal either during formation of the sleeve or during formation of the threads in the formed sleeve to produce a precision-shaped sleeve and threads.

Accordingly, it is a general object of the present invention to provide a method of making integral threaded fasteners in heavy gauge metal preferably formed steel parts.

Also, it is an object of the present invention to provide a new method of making composite metal-rubber products having precision formed threaded fasteners integral with the metal components of the composite products Furthermore, it is an object of the present invention to provide new cold extrusion procedures for forming integral tubular sleeves projecting from heavy gauge sheet metal elements.

Also, it is an object of the present invention to provide new cold working procedures for extruding tubular sleeves integrally from sheet metal material which avoid sleeve cracking, which avoid limitation as to sleeve length because of cracking, which avoid limitation as to sleeve length because of size of sleeve opening, which enable close tolerances in respect of inner and outer sleeve diameters to be maintained, which enable absolute inner and outer sleeve diameter concentricity to be maintained, and which provide a sleeve that may be threaded internally or externally with a substantial number of complete threads.

Moreover, it is an object of the present invention to provide new procedures for cold extruding an integral tubular sleeve from sheet metal material which avoid the deep drawing difficulties of cracking, length limitation, and lack of concentricity between and variations in inner and outer diameters of a sleeve which occur when a sleeve is formed in sheet metal by deep drawing procedures.

In addition, it is an object of the present invention to provide new procedures for cold extruding an integral tubular sleeve in heavy gauge sheet metal material which cold works the sleeve material under pressure during extrusion in a manner that permits threads to be cold formed subsequently in the sleeve by a roll-tapping operation without cracking or fracturing the sleeve and without metal loss during tapping.

Moreover, it is an object of the present invention to provide a new method of making a precision formed threaded fastener integrally in a sheet or plate metal stamping by cold pressure forming operations without appreciable scrap loss either in providing the desired thread formation or in forming a sleeve of desired length and thickness in which the thread formation is incorporated.

Also, it is an object of the present invention to significantly reduce the cost of making composite molded metal-rubber products in which threaded fasteners are incorporated from the standpoints of the metal material required for the metal components of the composite product and the number of operations involved in manufacturing the composite product.

In addition, it is an object of the present invention to provide a new procedure for cold forming an integral threaded sleeve fastener in steel plate material and for imparting to the cold formed threaded sleeve self-locking properties when a threaded member is in threaded connection with the threaded sleeve under predetermined torque-tension loading.

Likewise, it is an object of the present invention to provide new procedures for cold forming a threaded fastener sleeve projecting integrally from sheet metal material having self-locking characteristics with respect to a member such as a threaded bolt in threaded connection with the sleeve under predetermined torque-tension loading, and which is further characterized by return of the threaded sleeve to original undistorted shape upon release of the bolt from threaded self-locked connection with the sleeve.

Moreover, it is an object of the present invention to provide new procedures for cold forming an integral threaded fastener in heavy gauge steel material having a cold formed thread profile providing additional strength over that obtained when threads are formed by cutting operations, having a thread profile that may be formed in excess of 75% of full thread profile, and having substantially increased torque-tension loading strength (of the order of 100 to 65) as compared with prior forms of threaded fasteners.

Furthermore, it is an object of the present invention to provide new method procedures for forming threaded fasteners integrally in sheet metal material which may be incorporated as a part of usual sheet metal stamping procedures in the manufacture of stamped sheet metal parts formed with such integral threaded fasteners, so that the threaded fasteners may be incorporated in the stamped part with no additional material cost (such as the cost of separate threaded nut).

Finally, it is an object of the present invention to provide new cold forming procedures for the manufacture of integral threaded sleeves in stamped sheet metal products which eliminate difficulties heretofore encountered in the art, which avoid problems, reduce costs and provide products having enhanced characteristics in the manufacture of composite metal-rubber products, and which achieve the stated objects in a simple, effective and inexpensive manner and satisfy needs existing in the art.

These and other objects and advantages apparent to those skilled in the art from the following description and claims may be obtained, the stated results achieved, and the described difficulties overcome, by the methods, steps, procedures, treatments, and discoveries which comprise the present invention, the nature of which are set forth in the following general statements, preferred embodiments of which—illustrative of the best modes in which applicant has contemplated applying the principles—are set forth in the following description and shown in the drawings, and which are particularly and distinctly pointed out and set forth in the appended claims forming part hereof.

The nature of the discoveries of one aspect of the present invention may be stated in general terms as preferably including in the manufacture of composite molded metal-rubber products having at least one plate metal component provided with at least one threaded fastener sleeve projecting integrally from one surface of the component, the steps of cold extruding a tubular sleeve from a plate metal component blank of desired length to precision sleeve thickness and precision inner and outer sleeve diameter concentricity, then molding the extruded-sleeve-containing blank with rubber to form a composite metal-rubber product, then cleaning the inner surface of the tubular sleeve to at least remove contaminating rubber and adhesive material and to expose a clean metal inner sleeve surface, and then roll-tapping the exposed cleaned inner metal surface of the extruded tubular sleeve to form a threaded fastener projecting integrally from the plate metal component.

The nature of the discoveries of another aspect of the present invention may be stated in general terms as including in the manufacture of a precision formed threaded fastener sleeve projecting integrally from a surface of a plate metal stamping, the steps of providing a plate metal, preferably steel, blank; piercing a hole in the blank having a diameter preferably in the range of less than up to equal to the blank thickness; then shaving the annular surface of the pierced hole to eliminate the normal metal breakout resulting from piercing and to form a substantially cylindrical shaved hole surface having a uniform diameter throughout; then confining the blank from within the shaved hole and at annular areas at the top and bottom surfaces of the blank surrounding the ends of the shaved hole, then forwardly extruding the blank metal to displace the thus-confined metal under compression from that portion of the blank which surrounds the shaved hole downwardly of the blank bottom surface to form a sleeve projecting integrally from the blank having cylindrical inner and outer concentric sleeve surfaces thereby providing a tubular sleeve wall of precision formed uniform thickness extending between the bottom surface of the blank and a chamfered end portion at the open end of the sleeve; then removing confining pressure from the cold extruded chamfered open sleeve end, then coining pressure forming a tapered annular chamfer at the intersection of the top blank surface and the inner cylindrical sleeve surface by pressure applied at said intersection to further cold work and displace metal forwardly in the sleeve during the coining step, and to impart a permanent set to the cold worked sleeve metal; selectively rearwardly extruding metal in the sleeve under confined pressure to form a predetermined sleeve length and to reduce the annular chamfered zone at the open end of the extruded sleeve; then drilling the inner cylindrical sleeve surface and chamfer at said intersection of the top blank surface and the inner cylindrical sleeve surface to remove a thin skin of work-hardened metal and to relieve stresses resulting from the cold extrusion of the sleeve from and at the inner cylindrical sleeve surface, and to expose for further processing clean stress relieved metal at the inner cylindrical sleeve surface; and then roll-tapping the inner cylindrical sleeve surface to form threads of desired size and profile having cold worked surfaces without metal loss.

By way of example, the improved procedures for forming threaded fasteners integrally in stamped or drawn sheet metal products, as well as various die means and other equipment used to carry out the procedures, are shown somewhat diagrammatically in the accompanying drawings forming part hereof in which:

FIG. 22 is a longitudinal sectional view of a composite molded metal-rubber product in which a plate metal stamping having an integral threaded fastener produced in the manner illustrated for example in FIGS. 1, 14, 15, 16, 17, and 19 is incorporated as a component;

FIG. 23 is a section looking in the direction of the arrows 23—23, FIG. 22;

FIG. 24 is a perspective view somewhat diagrammatically illustrating a composite molded metal-rubber mounting pad incorporating integral threaded fasteners made in accordance with the invention;

Figure 1:
FIGURE 1 is a sectional view of a sheet or plate metal blank in which the improved threaded fastener is to be formed.

FIG. 25 is a side elevation, with parts broken away and in section of a composite molded metal-rubber product different from that shown in FIGS. 22 and 23 but incorporating a metal component having an integral threaded fastener made in accordance with the invention; and FIG. 26 is a perspective view of another form of sheet or plate metal stamping having an integral threaded fastener sleeve formed therein in accordance with the invention.

Similar numerals refer to similar parts throughout the various figures of the drawings.

The improved method is illustrated in the drawings somewhat diagrammatically in FIGS. 1, 14, 15, 16, 17, 19, and 20 which show a plate metal blank in various stages of the procedure used to form a threaded fastener sleeve projecting integrally from the surface of the blank. Steps in the method also are illustrated somewhat more in detail by the dies used in various stages of the procedure as shown in FIGS. 2 through 9. Other operations carried out are indicated diagrammatically in FIGS. 10, 11, 18, and 21.

Figure 3:
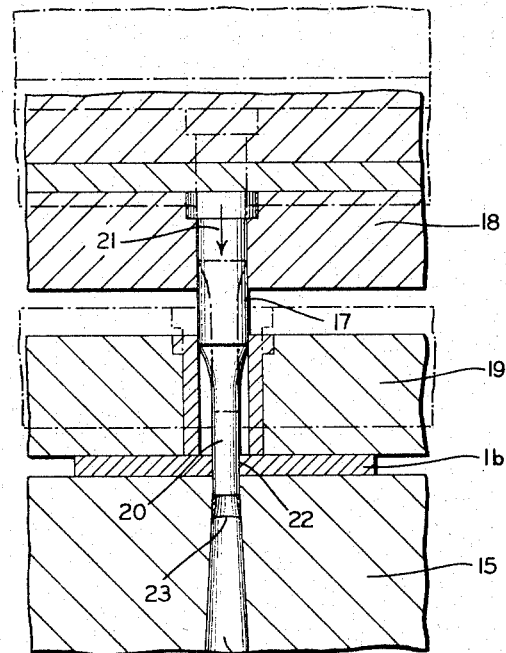
FIG. 3 is a view similar to FIG. 2 showing the next shaving step of the new method.
Figure 19:
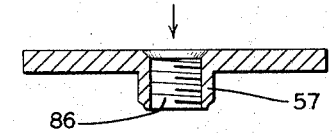
FIG. 19 is a view similar to FIG. 17 illustrating the integral threaded sleeve fastener resulting from the roll-tapping operation shown in FIG. 11.
Figure 4:
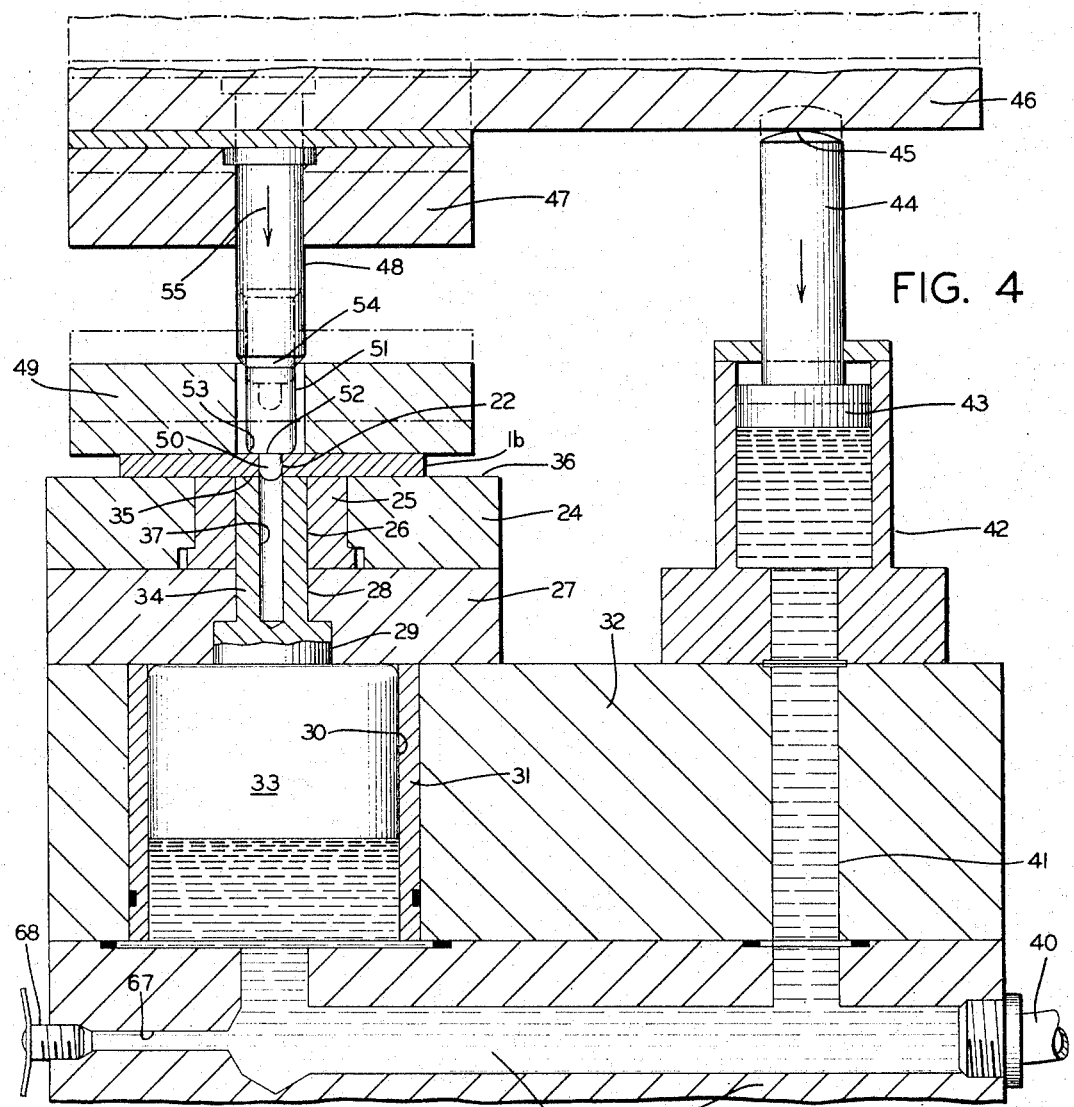
FIG. 4 is a somewhat diagrammatic sectional view of die control means used for the next forward extrusion step of the new method, illustrating the die means and blank in their relative positions at the beginning or initial stage of the forward extrusion operation.

While the drawings indicate the cold extrusion of only one sleeve in one flat plate metal blank, more than one sleeve can be formed by duplicating the dies and other tools used at each stage of the procedure. Also, the blank is not necessarily merely a flat blank at all stages but may have flanges, etc. formed therein at certain stages to form the desired shape of metal stamping. Further, although separate dies are illustrated in FIGS. 2, 3, and 4, the operations there shown, if desired, may be incorporated in progressive stamping die means used to stamp and form a stamped plate metal component in which one or more tubular sleeves are cold extruded.

The plate metal blank 1 (FIG. 1) has the required size and thickness to form the desired finished stamped plate metal component from which a threaded fastener sleeve or sleeves integrally project. The component may be incorporated in a composite molded metal-rubber product such as shown at 2, 3, and 4 in FIGS. 22, 23, 24, and 25.

Figure 2:
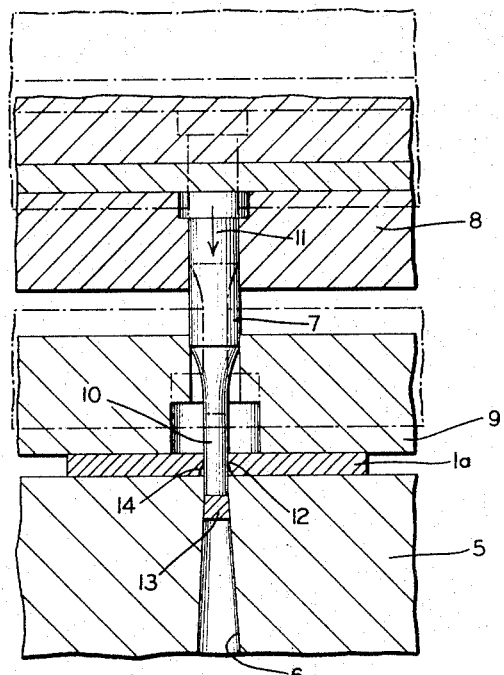
FIG. 2 is a somewhat diagrammatic sectional view illustrating the first or piercing step of the new method or procedure.
Figure 14:
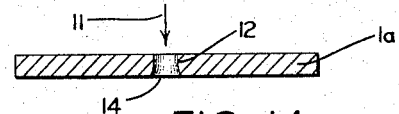
FIG. 14 is a diagrammatic sectional view of a pierced blank resulting from carrying out the piercing operation of FIG. 2 on the blank of FIG. 1.

The first step in the new method is a usual piercing step which may be carried out in the die means illustrated in FIG. 2. The die means includes a die shoe 5 having a piercing opening 6 formed therein, a punch 7 carried by punch holder 8, and a spring-pressed stripper plate 9 carried by punch holder 8. Die shoe 5 may be mounted in the usual manner on the bed of a punch press and punch holder 8 is carried by the punch press ram or movable head.

The positions of the nose 10 of punch 7 and of punch holder 8 and stripper plate 9 when the ram is raised and the die means is open for locating a blank on the die shoe 5 are shown in dot-dash lines in FIG. 2. The position of the parts at the completion of the piercing operation is shown in full lines. Blank 1 is placed on die shoe 5 when the die means is open. Punch holder 8 during initial downward movement as indicated by arrow 11 in FIGS. 2 and 14 causes stripper plate 9 to clamp blank 1 against die shoe 5. During continued downward movement of punch holder 8, punch nose 10 pierces blank 1 at 12 forming pierced slug 13 and pierced blank 1a.

The pierced opening 12 in accordance with usual practice has a diameter in general substantially equal to but not greater than the thickness of the metal pierced, that is the thickness of blank 1. However, where desired, pierced hole 12 may have a diameter less than the thickness of blank 1. Metal breakout at the bottom of pierced hole 12 occurs when plate metal is pierced, normally extending through about 60% of the sheet or plate metal thickness, the breakout being diagrammatically indicated at 14 in FIG. 14.

I have discovered that in order successfully to extrude from a relatively thick plate metal blank 1a a sleeve of any substantial length, this metal breakout 14 in pierced hole 12 must be obliterated or removed and a hole having uniform diameter throughout must be established.

Figure 15:
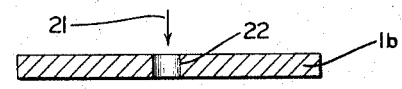
FIG. 15 is a diagrammatic view similar to FIG. 14 illustrating the shaved blank produced by carrying out the shaving operation of FIG. 3.

The breakout 14 in accordance with the invention is removed in the second step of the new method which may be carried out in die means illustrated in FIG. 3 to produce blank 1b shown in FIG. 15. This second step in the new method is a shaving operation. The die means of FIG. 3 includes a die shoe 15 having a punch-receiving opening 16 formed therein, a punch 17 carried by punch holder 18 and a spring-pressed stripper plate 19 carried by punch holder 18. Die shoe 15 is mounted on the bed of a punch press and punch holder 18 is carried by the punch press ram.

The positions of the punch nose 20 of punch 17 and of punch holder 18 and stripper plate 19 with the die means open for receiving a blank 1a to be shaved are shown in dot-dash lines in FIG. 3. The parts at the completion of the shaving operation are shown in full lines in FIG. 3. With the die open, pierced blank 1a is placed on die shoe 15 and during downward movement of punch holder 18, the blank first is clamped by stripper plate 19 against die shoe 15. As such downward movement continues as indicated by arrow 21 in FIGS. 3 and 15, punch nose 20 shaves the breakout surface 14 of pierced hole 12 to form a truly cylindrical shaved hole 22 in shaved blank 1b. The metal containing the non-uniform breakout surface 14 shaved from blank 1a to form blank 1b is indicated at 23 in FIG. 3.

The next step of the new method in accordance with the invention is a cold extrusion operation which may be carried out in die means illustrated somewhat diagrammatically in various stages of operation in FIGS. 4, 5, 6, and 7. The extrusion die means includes a die shoe 24 having an insert 25 provided with a cylindrical die cavity opening 26. A supplemental die shoe 27 is formed with a cylindrical opening 28 of the same size as and aligned with the die cavity opening 26. The lower end of opening 28 is enlarged at 29 and communicates with a cylinder 30 formed by liner 31 in die shoe base member 32. A piston 33 is movable in cylinder 30 having an upwardly projecting tubular die support sleeve 34 movable in die cavity opening 26. The upper end 35 of support sleeve 34 is flush with the upper surface 36 of die shoe 24 when piston 33 is at its upper limit of movement as illustrated in FIG. 4. Support sleeve 34 is formed with a central tubular opening 37 having the same diameter as the diameter of shaved hole 22 in blank 1b.

A passageway 38 formed in die shoe base member 39 which supports base member 32, communicates with the lower end of cylinder 30 beneath piston 33 and may be connected at 40 with a source of hydraulic pressure to be described below. A branch passageway 41 communicates with passage 38 through shoe base members 39 and 32 to the lower end of a cylinder 42 mounted on base member 32. Piston 43 is movable in cylinder 42 and a piston rod actuator 44 extends upwardly from cylinder 42 having an upper end 45 adapted to be engaged by the ram or movable head 46 of a punch press. A punch holder 47 is mounted on ram 46 carrying a punch 48 which cooperates with die cavity opening 26. A spring-pressed stripper plate 49 also is carried by punch-holder 47.

Punch 48 is formed at its lower end with a rounded pilot nose 50 having a diameter equal to the diameter of the shaved hole 22 formed in shaved blank 1b and to the diameter of the central opening 37 in support sleeve 34. Punch 48 is formed above nose 50 with a cylindrical portion 51, the lower end of which terminates in a flat work nose 52 from which the pilot nose 50 projects, the flat annular work nose 52 being connected with the cylindrical portion 51 preferably by rounded corner 53.

The cylindrical punch portion 51 terminates at its upper end in a tapered or conical coining shoulder 54, which defines the lower outer extremity of the maximum diameter portion of punch 48.

The position of the various parts of the extrusion die means with the die open is shown in dot-dash lines in FIG. 4 and the position of the parts in full lines in FIG. 4 indicates the stage of downward movement of ram 46 and punch 48 when the flat punch work nose 52 has just engaged the top surface of shaved blank 1b.

Assume that blank 1b has been placed on die shoe 24 when the die means was in open position. During initial downward movement of punch 48 as indicated by arrow 55 in FIG. 4, stripper plate 49 clamps blank 1b abainst die shoe surface 36. Thereafter, pilot noise 50 enters shaved hole 22 of blank 1b as shown, and flat work nose 52 of punch 48 engages the top surface of blank 1b immediately surrounding the upper end of the hole 22.

At this time, the cushion piston 33 on which die support sleeve 34 is mounted is at its upper limit of movement, having been moved and held there by hydraulic pressure in cylinder 31 and passageways 38 and 41.

When ram 46 was at its upper limit of travel, the upper end 45 of piston rod actuator 44 was not engaged by the ram, as shown in dot-dash lines in FIG. 4; and piston 43 was at its upper limit of movement in cylinder 42.

During the initial downward movement of ram 46 and punch 48, and prior to engagement of punch 48 with blank 1b in the full line piston shown, ram 46 engages the upper end 45 of piston rod actuator 44 moving piston 43 downward in cylinder 42 to the full line position shown at the time when flat punch work nose 52 engages blank 1b. This downward movement of piston 43 increases hydraulic pressure in the system connected to the lower end of cylinder 30 thereby increasing the hydraulic pressure exerted upwardly on piston 33 and thereby the resistance to movement of the upper end 35 of die support sleeve 34 which supports the blank immediately surrounding the lower end of the hole 22.

Thus, with the die parts in the position shown in FIG. 4, the blank metal is confined from within the shaved hole 22 by pilot nose 50 of punch 48 and is confined at annular areas at the top and bottom surfaces of the blank surrounding the ends of the shave hole 22, respectively, by the annular flat work nose 52 of punch 48 and the upper end 35 of support sleeve 34.

Figure 5:
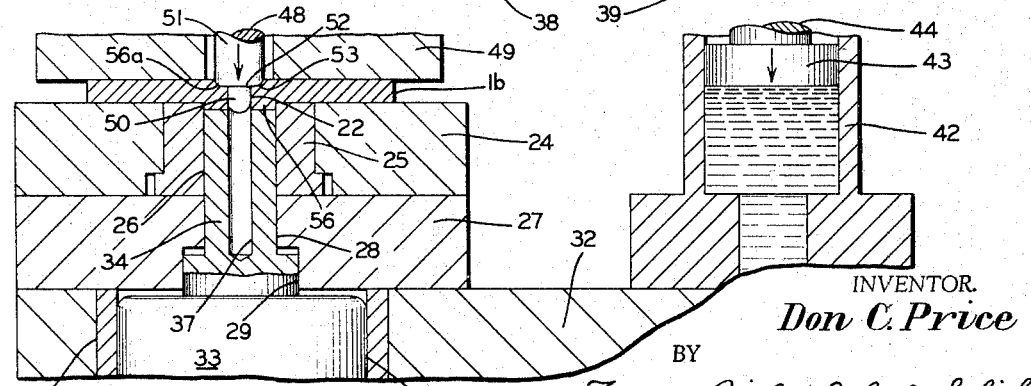
FIG. 5 is a fragmentary view of a portion of FIG. 4 illustrating the die means and blank being cold worked at an intermediate stage of the forward extrusion operation.

A next stage of continued downward movement of punch 48 is illustrated diagrammatically in FIG. 5. Punch flat work end 52 and rounded punch corner 53 have entered at 56a the blank metal surrounding the previous location of the upper end of shaved hole 22 in blank 1b. Punch pilot portion 50 continues to confine the inner surface of shaved hole 22. Metal from the blank while confined and under pressure has started to extrude downwardly or forwardly within cylindrical die cavity 26 as indicated at 56 in FIG. 5.

As shown, the forward extrusion of the confined blank metal displaces such metal while under compression from that portion of the blank which surrounded the shaved hole 22, downwardly of the blank bottom surface.

Meanwhile, piston 43 (FIG. 5) has moved downwardly in cylinder 42 further increasing the upward pressure on piston 33 in cylinder 30. However, piston 33 acts as a cushion and even though pressure is increased thereon, piston 33 yields downwardly in response to positive downward movement of punch 48 and to downward movement of extruded metal 56 while maintaining the extruded metal confined under compression as shown in FIG. 5.

Figure 6:
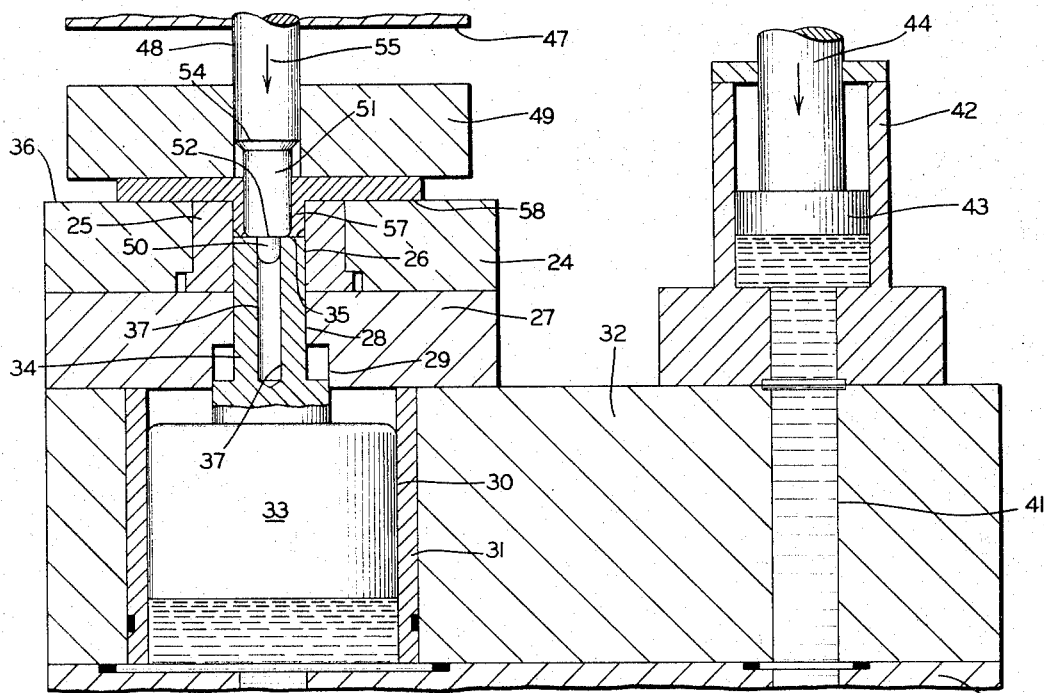
FIG. 6 is a view similar to FIG. 5 showing the various parts at a later stage of the forward extrusion operation.

FIGURE 6 illustrates the position of the parts at a further stage in the cold extrusion step when the cylindrical punch portion 51 has substantially completely penetrated the blank and has substantially completed the forward extrusion of a sleeve 57 extending integrally from the blank. Sleeve 57 has uniform inner and outer diameters defined, respectively, by the outer surface of cylindrical punch portion 51 and the inner cylindrical die cavity surface 26. Moreover, concentricity between the inner and outer sleeve surfaces has been maintained and established initially by the piloting of pilot portion 50 in shaved hole 22 and finally by the reception of pilot portion 50 within the upper end of central opening 37 of support sleeve 34, as shown. Thus, the tubular sleeve 57 has a precision formed wall of uniform thickness extending from the bottom surface 58 of the extruded blank and the lower or open end of the sleeve.

During movement of punch 48 to the position shown in FIG. 6 which substantially completes the forward extrusion of sleeve 57, the confined blank metal continues to be displaced or forwardly extruded while under compression because of the upward pressure exerted by support sleeve 34. Meanwhile, piston 43 (FIG. 6) continues to move downwardly in cylinder 42 further increasing the upward pressure on piston 33 in cylinder 30. As previously indicated, piston 33 acts as a cushion and even though pressure is increased thereon, piston 33 yields downwardly in response to positive downward movement of punch 48 and to the forward extrusion of the metal in sleeve 57 while continuing to maintain the extruded metal confined under compression as shown in FIG. 6.

Figure 7:
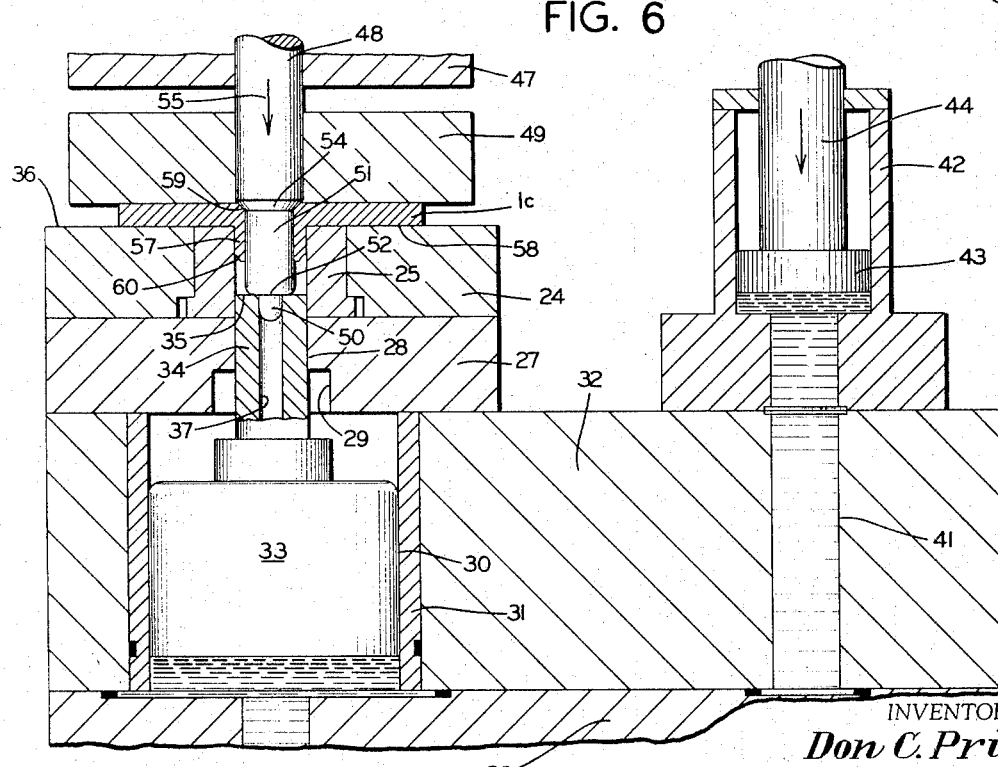
FIG. 7 is a view similar to FIGS. 4, 5, and 6 showing the die means of FIG. 4 at the completion of downward punch movement of the forward cold extrusion operation.

FIGURE 7 illustrates the final position of the parts at the conclusion of the forward extrusion step. Cylindrical punch portion 51 has completely penetrated the blank and extends through extruded sleeve 57. Punch 48 engaging the upper end 35 of support sleeve 34 has pushed piston 33 downward to its lower limit of travel, overcoming the hydraulic pressure on sleeve 34.

Meanwhile, coining shoulder 54 of punch 48 during downward movement to the position shown in FIG. 7 engages the blank at the intersection of the top blank surface and the inner diameter of the sleeve 57 to form a chamfered corner 59. During the downward punch movement, the confining pressure on the extruded sleeve metal is relieved as the upper end 35 of support sleeve 34 moves away from the open end 60 of extruded sleeve 57. The coining shoulder 54 of punch 48 exerts a coining pressure upon the metal in the blank in forming the chamfered frusto-conical-shaped shoulder or corner 59 and further cold works and displaces metal forwardly or downwardly in the sleeve. Finally, the coining pressure of punch shoulder 54 imparts a permanent set to the cold worked sleeve metal.

Figure 16:
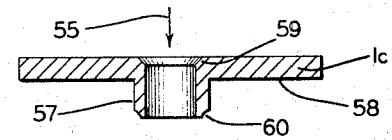
FIG. 16 is a view similar to FIGS. 14 and 15 illustrating the forwardly extruded blank resulting from the operation whose stages are illustrated in FIGS. 4 through 7.
Figure 17:
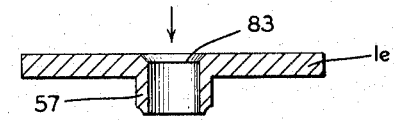
FIG. 17 is a view similar to FIG. 16 illustrating the drilled and cleaned blank resulting from the drill cleaning operation shown in FIG. 10.

As shown in FIGS. 6, 7, and 16, the extruded blank 1c with an integral extruded sleeve 57 has a somewhat chamfered corner, formation at its lower or open end 60 resulting from the displacement of metal in forwardly extruding the sleeve 57 and in the final coining stage of the extruding operation.

As punch 48 is withdrawn from the die cavity by upward movement, stripper plate 49 strips the extruded blank 1c from the punch and the hydraulic pressure on cushion piston 33 pushes support sleeve 34 upwardly to knock the extruded blank 1c out of the die cavity.

Figure 13:
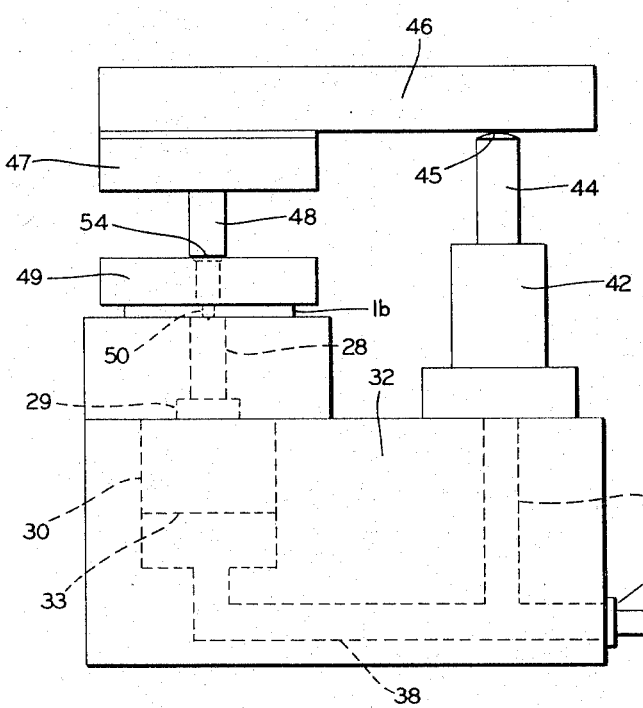
FIG. 13 is a diagrammatic view illustrating the hydraulic and pneumatic control equipment used in connection with the die and control means illustrated in FIGS. 4, 5, 6, and 7.

The extrusion die means of FIGS. 4 to 7 is illustrated diagrammatically in FIG. 13 which also shows the source of hydraulic pressure connected at 40 with the hydraulic system communicating with cylinder 30. Hydraulic pressure may be supplied from a portable air-hydraulic unit 61 which may be mounted on a frame member 62 of the punch press. Hydraulic supply unit 61 is of known construction and may contain a large air cylinder 63 and a small hydraulic plunger acting in a cylinder not shown connected with a reservoir 64 and line 65 to connection 40. Air under pressure is supplied through line 66 to the air cylinder 63.

Any desired degree of hydraulic pressure can be obtained in line 65 by regulating the air pressure in cylinder 63. Thus, pressure in the system 38–41 controlling operation of cushion piston 33 may be regulated. Assuming that a predetermined loading of hydraulic pressure in the system has been established by regulation of air pressure in unit 61, the system pressure to cylinder 30 is increased by downward movement of piston 43 in cylinder 42. The timing of starting an increase of hydraulic pressure in the system 38–41 may be determined by the length of piston rod actuator 44. As shown in FIG. 4, pressure increase in the system 38–41 commences just just prior to engagement of the flat punch nose 52 with shaved blank 1b. Control of the amount of pressure increase during the stroke of ram 46 may be determined by the relative diameters of pistons 33 and 43.

The hydraulic system may be provided if desired with a connection 67 to a bleeder or relief valve 68. Valve 68 may be operated to bleed the system where necessary. Also, it may be equipped with safety valve means adapted to open when the hydraulic system pressure becomes greater than the capacity of components of the equipment.

Thus, the operation of the hydraulic system on cushion piston 33 and support sleeve 34 by the timed action of piston 43 establishes a continuing pressure increase in the system exactly when needed for maintaining the blank metal confined under pressure to obtain proper flow and displacement of metal in the blank while being forwardly extruded.

In other words, the upper end 35 of support sleeve 34 holds the underside of the blank metal around shaved hole 22 as a backup cushion while the punch pilot nose 50 enters the shaved hole 22 (FIGS. 4–7) and travels downwardly therein accompanied by pressure entry of the flat work nose 52 and forming shoulder 53 downward into the blank metal to extrude the metal downward into the larger die cavity 26 against the end 35 of cushion support sleeve 34 which yields to permit extrusion flow of metal under pressure.

The cushion support sleeve 34 by reason of the increasing upward pressure thereon is not pushed downward by extrusion metal flow at the same rate as the rate of downward travel of punch 48. Thus, punch 48 approaches and finally contacts the upper end of sleeve 34 at the stage of the forward extrusion operation illustrated in FIG. 6. Meanwhile, metal in the blank is trapped at all times between punch and die and support surfaces so that the metal is under pressure as extruded.

The coining pressure exerted by punch shoulder 54 at the limit of downward movement of punch 48, in addition to forming the chamfer 59, and in addition to setting the metal and reducing stresses in the worked area, enables some additional length of extruded sleeve 57 to be obtained. The setting of the metal in extruded sleeve 57 produced by the coining stage of punch travel results in retaining the extruded blank 1c in the exact form and shape provided by the die parts upon removal of the extruded blank 1c from the die. That is, the worked metal which has been set, does not spring or distort to another shape on removal from the punch and die.

Early attempts to form the extruded sleeve without concluding the forward extrusion step with a coining stage to coin and set the metal in the sleeve, resulted in a sleeve, which when removed from the extrusion die, sprung to a somewhat accordion-like or corrugated shape in which threads could not be provided satisfactorily.

I have discovered, where it is attempted to extrude a relatively thick plate metal blank 1a retaining and without removing the breakout formation 14 of pierceed hole 12 by omitting the shaving operation generally indicated in FIG. 15, that the open end of the extruded sleeve produced may have a scalloped formation originating from the breakout shape, or cracks in the end of the extruded sleeve may actually occur. These cracks will increase and a scalloped formation will have a tendency to crack if the sleeve metal is cold worked or cut subsequently in any manner rendering the product unsuitable for use.

Where a substantially shorter sleeve length than illustrated may serve the intended purpose, or where a scalloped edge or cracks in the sleeve do not prevent use of the extruded part, then and in such instances only, the shaving step may be omitted.

Figure 20:
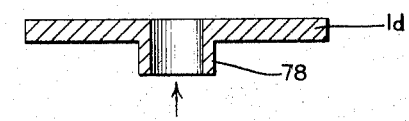
FIG. 20 is a view similar to FIG. 16 but showing the blank resulting from the sleeve-length-sizing operation, when used, such as illustrated in FIGS. 8 or 9.
Figure 8:
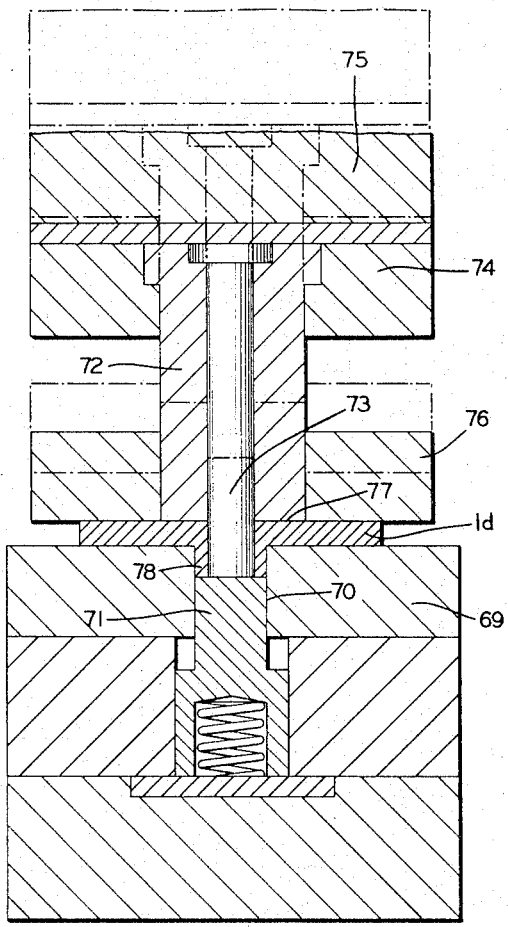
FIG. 8 is a somewhat diagrammatic sectional view illustrating a next sleeve-length-sizing operation sometimes used in accordance with the invention.

The length of extruded sleeve 57 in successive blanks cold extruded in die means such as illustrated in FIGS. 4, 5, 6, and 7 may not be uniform or exactly the same. Where a uniform or exact sleeve length is required, the forwardly extruded sleeve 57 is preferably rearwardly extruded by a sleeve-length-sizing operation to provide a sized blank 1d such as illustrated in FIG. 20. The sleeve-length-sizing operation may be carried out in a die such as shown in FIG. 8 having a die shoe 69 provided with a die cavity 70 closed by a movable spring-pressed die bottom member 71. The die means also includes a punch 72 with a reduced nose 73 carried by punch holder 74 mounted on a punch press ram 75. Punch holder 74 also carries spring-pressed stripper plate 76. After insertion of an extruded blank between punch 72 and die shoe 69 when the die of FIG. 8 is open (the open position of the punch being illustrated in dot-dash lines) downward movement of punch 72 enters reduced nose 73 into the opening through sleeve 57 and the lower end 77 of punch 72 presses the sleeve metal axially against die cavity bottom member 71 to develop the exact sleeve length desired. This operation is accompanied by some backward extrusion of the metal in the sleeve which (FIG. 21) eliminates chamfer 59 at the upper end and the chamfer 60 at the lower end of the extruded sleeve, to form a sleeve shape of predetermined length as indicated at 78 in FIGS. 8, 20, and 21. However, the metal in the sleeve after backward extrusion is in the "set" condition described and does not change shape when removed from the die.

Figure 9:
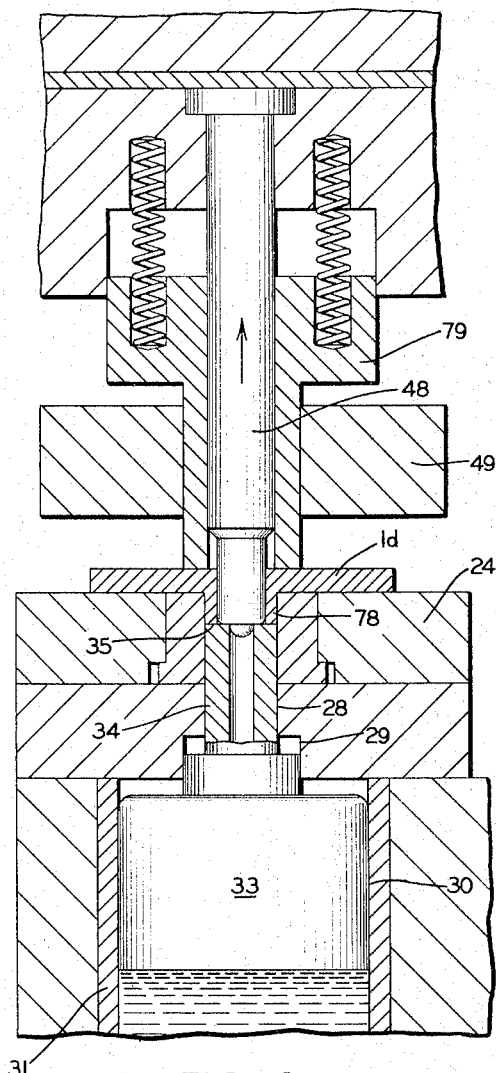
FIG. 9 is a somewhat diagrammatic sectional view of a modified form of certain portions of the die means illustrated in FIGS. 4, 5, 6, and 7, incorporating in such die means the sleeve-length-sizing operation alternatively illustrated in FIG. 8, for sizing the sleeve length during retraction of the die means cold extrusion punch.

Alternatively when desired, the backward extrusion, sleeve-length-sizing operation may be built into the cushioned die construction of FIGS. 4 to 7 as illustrated in FIG. 9 wherein a supplemental spring-pressed hold-down punch 79 surrounds punch 48 to hold the extruded blank against die shoe 24 during initial upward movement of punch 48 and of stripper plate 49, as shown. In this manner, the upper end 35 of cushion support sleeve 34 by the hydraulic pressure maintained against piston 33 follows upwardly with upward movement of punch 48 to backwardly extrude metal in the sleeve 57 and provide a predetermined sleeve length also as indicated at 78 in FIG. 9.

The extruded blank 1c or 1d may be molded with rubber and with one or more additional formed or stamped metal parts if desired, in a usual manner in accordance with rubber molding procedures, to form a composite metal-rubber product such as illustrated in FIGS. 22 through 25. FIGS. 22 and 23 illustrate the extruded blank 1c of FIG. 16 molded with rubber 80 to an angular flanged U-shaped metal component 81 to form a composite molded product 2.

Figure 10:
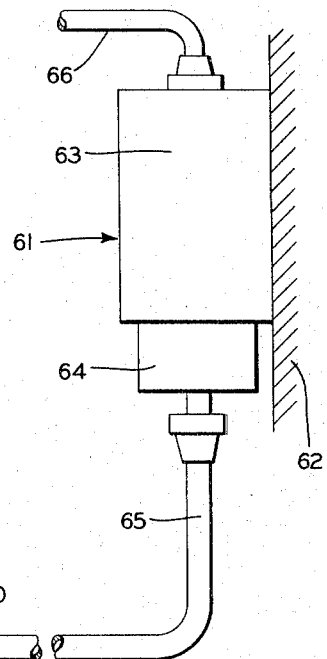
FIG. 10 is an enlarged diagrammatic sectional view illustrating the drilling step used to clean the interior of the cold formed sleeve after the sleeve-containing metal stamping of FIG. 7 has been bonded to rubber as a component of a composite molded metal-rubber product.
Figure 10:
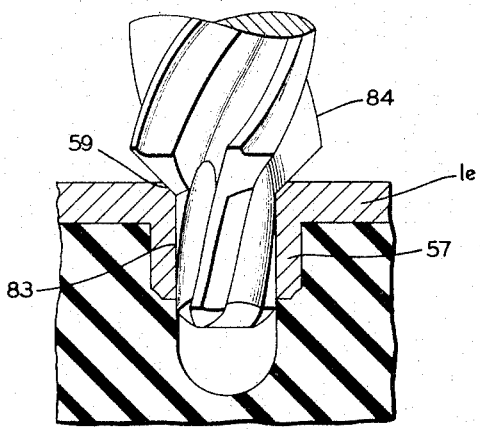
Figure 18:
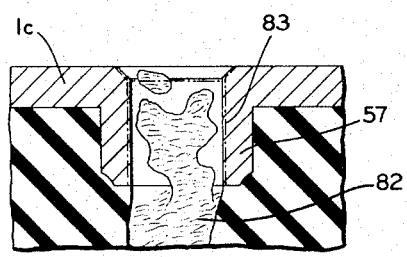
FIG. 18 is an enlarged diagrammatic sectional view of a portion of the article shown in FIG. 17 bonded to rubber illustrating the manner in which the tubular sleeve is drilled and cleaned.

The interior of sleeve 57 of molded product 2 after molding as well as chamfered area 59 is drilled as shown in FIG. 10 to remove contaminating material such as rubber and adhesive indicated at 82 in FIG. 18 and also preferably to remove a thin skin of metal, illustrated diagrammatically between the full and dot-dash lines at 83 in FIG. 18, from the work-hardened metal surfaces of the sleeve. As indicated, this drilling operation may be performed by a sub-land drill with drilling flutes arranged to cut and drill the cylindrica and chamfered hole surfaces, such a drill being indicated at 84 in FIG. 10. A drilled blank omitting the rubber is also indicated at 1e in FIG. 17.

The drilling step in accordance with the invention serves a variety of purposes. First of all, it removes burrs or score marks from the interior of sleeve 57 which may have resulted from a cold extrusion operation when a punch has become worn. Second, contaminating rubber or rubber adhesive material used to bond the rubber to the metal in the rubber molding step such as indicated at 82 in FIG. 18 is removed. This contaminating material is very abrasive and can be damaging in carrying out a subsequent roll-tapping operation. Third, the drilling step produces a close tolerance sleeve hole size which enables an increased height of thread profile to be provided in the subsequent roll-tapping operation.

Finally, the drilling operation in removing a thin skin of work-hardened metal indicated at 83 from the interior of the sleeve not only relieves stresses resulting from the cold extrusion of the sleeve but exposes for further processing clean stress-relieved metal with no work-hardened surface hinderance to a subsequent roll-tapping operation.

The next operation in the production of an integral threaded fastener, particularly a fastener formed in a metal component of a composite metal-rubber product, is to form threads internally of an extruded sleeve, such as sleeve 57 of drilled blank 1e or sleeve 78 of sleeve-length-sized blank 1d. The clean and properly sized hole 83 resulting from the drilling operation is drilled to have a diameter corresponding substantially to the pitch diameter of the threads to be formed therein.

Figure 11:
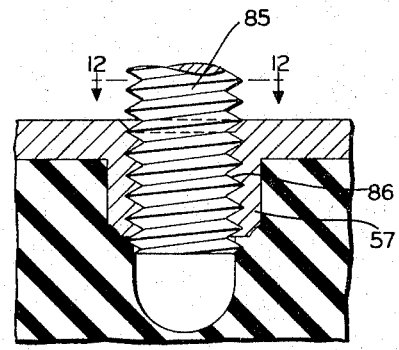
FIG. 11 is a diagrammatic view similar to FIG. 10 illustrating the roll tapping step of the new procedure.
Figure 21:
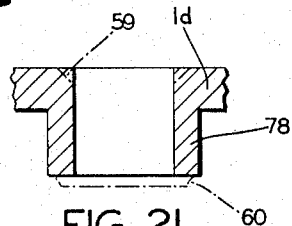
FIG. 21 is an enlarged view of a portion of FIG. 20 illustrating the backward extrusion sleeve-length-sizing operation.
Figure 12:
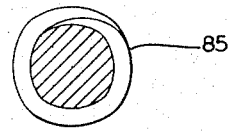
FIG. 12 is a section looking in the direction of the arrows 12—12, FIG. 11.

The threads, in accordance with the invention are formed by a roll-tapping operation carried out with a fluteless roll thread tap indicated at 85 in FIGS. 11 and 12. The fluteless roll-tap 85 forms no part of the invention, and may be a tap such as illustrated in Wells Reissue Pat. No. 24,572. However, the formation of threads by a roll-tapping operation as a step in the new procedure is important since the roll-tapping operation forms the desired threads 86 in sleeve 57 without metal loss by cold working the metal in the interior of the sleeve and by displacing the cold worked metal to establish the thread profile.

I have discovered that such a roll-tapping operation can be carried out successfully to thread an extruded sleeve without cracking or weakening the sleeve and without any loss of metal. Heretofore, where it has been attempted to thread a sleeve drawn from sheet metal either by roll-tapping or by cutting threads, the sleeve failed either by cracking or by thinning as a result of metal cut away to form the threads.

As indicated, threading of an extruded sleeve by a roll-tapping operation is carried out as a last step in the procedure, after molding the composite metal-rubber product. In this manner the formed threads are clean and the formation of the threads by cold working and metal displacement is not obstructed by rubber or other contaminating material which has been eliminated by the previous drill-cleaning operation.

It appears that the roll-tapping operation cannot be practically and properly carried out at least under high production procedures unless a thin skin 83 of work-hardened material at the inner surface of the extruded sleeve is removed prior to roll-tapping. The full explanation of this situation has not been determined. It is known to be vital to eliminate all foreign matter from the interior surface of the extruded sleeve such as rubber and adhesive material before roll-tapping. Such foreign matter if not removed has an abrasive action preventing the proper formation of threads by a roll-tapping operation.

It also appears that the metal at the inner surface of the extruded sleeve work-hardened during cold extrusion is hardened to such an extent that it hinders a roll-tapping operation from being carried out properly. The removal of the thin skin of work-hardened metal at 83 by the drilling operation appears not only to expose a clean metal surface containing metal more readily formed and displaced by a roll-tapping operation, but also to expose softer metal backed up by hardened material at the outer diameter of the sleeve which softer metal may be formed satisfactorily by a roll-tapping operation to provide a rather complete desired thread profile.

In actual use of the invention, for example, 7/16" threads—14 threads per inch are satisfactorily and successfully roll-tapped by production procedures in a sleeve 0.430" long extruded in 8 gauge sheet or plate steel in accordance with the procedures of the present invention. Such a sleeve 57 may have an outside diameter of from 0.529" to 0.539", and the length of the sleeve (not backward extruded to maintain absolute uniformity in sleeve length) may range from 0.410" to 0.450" so that more than five full threads are formed. The sleeve length (0.410" to 0.450") is thus approximately equal to the internal sleeve diameter of 0.457" to 0.467" where the uniform sleeve thickness in the example given is 0.072" as stated below. In carrying out the drilling step, a skin of work-hardened metal from 0.0025" to 0.0075" thick is removed from the inner diameter of the sleeve. In carrying out the shaving operation, the average maximum thickness of the ring-like shaved slug 23 removed is about 0.005" for a pierced hole adapted for forming an extruded sleeve having the dimensions indicated and roll-tapped to provide the threads described.

Since the end of the extruded sleeve 57 or 78 is not fractured, cracked, or subject to cracking, the exterior of the sleeve may be threaded rather than the interior, if desired, without failure of the sleeve.

Obviously, the length and thickness of the extruded sleeve are dependent somewhat upon the thickness of the plate metal from which the sleeve is extruded and the outer diameter of the extruded sleeve. As indicated, normally the initial pierced opening will have a diameter approaching but not in excess of the plate thickness. However, where increased sleeve thickness or length or both are desired, additional blank metal for the sleeve may be made available by reducing the size of the initially pierced opening to have a diameter substantially smaller than plate thickness.

Early attempts to form sleeve 57 by extrusion procedures in which the metal being extruded was not backed up by the cushion support sleeve 35 ended in failure. Without cushioned support sleeve backup trapping of the metal to hold the metal under pressure during extrusion, the deformed metal was free to move in an umbrella-like fashion and to explode out into the lower die cavity resulting in cracking. This was fundamentally the same type of cracking failure as occurs when it is attempted to form the sleeve by deep drawing procedures.

In accordance with the invention, the cushioned support backup of the sleeve metal during extrusion followed by coining and setting the metal in the extruded sleeve as a final stage of the extrusion operation enable an extruded sleeve, having substantial and uniform thickness and length and which may be satisfactorily threaded, to be incorporated integrally in relatively thick plate metal without spring-back distortion of the sleeve upon removal of the extruded metal from the extrusion die.

The composite product 2 illustrated in FIGS. 22 and 23 includes a metal component containing an integral threaded fastener arranged with respect to the rubber bonded to the metal components so that the threaded sleeve 57 projects inwardly into the rubber. This arrangement may be reversed as in the product 4 illustrated in FIG. 25 which includes two metal components 87 and 88 bonded by rubber 89 and having an integral threaded sleeve 90 preferably sized to exact length projecting outwardly from the outer surface of component 88 away from the rubber.

FIGURE 24 illustrates a composite product 3 formed of an upper metal component 91, a lower metal component 92 and an intervening block of rubber 93 molded thereto. Each of members 91 and 92 is formed from extremely light gauge sheet metal, and each also is formed with an integral tubular internally threaded sleeve 94 projecting outwardly of the component produced in accordance with the invention.

FIGURE 26 illustrates another type of metal stamping 95 formed with an integral threaded sleeve fastener 96 having internal threads 97. The sleeve 96, however, is formed in and projects laterally from one of the flanges 98 of the stamping 95 rather than from the web 99 of the stamping.

Each of the products 2, 3, 4, and 95 may replace a similar product having a threaded fastener provided by a nut welded to the sheet metal component, with the savings at least of a minimum additional cost for any fastener determined by the unit cost of the nut. In accordance with the invention, no additional or new metal is required, the metal for forming the threaded fastener being extruded from the blank in which the fastener is provided. The only additional cost in forming the threaded fastener in accordance with the invention is the initial cost of the dies used to carry out the successive operations; and these preferably are incorporated, as indicated, in and as a part of other die operations required for forming the metal stampings produced.

The new extruded plate metal product, the new extruded threaded plate metal product, and the new composite metal-rubber product having a metal component formed with an integral threaded fastener have a number of new properties, characteristics, and advantages and contain a rare combination of new properties, characteristics, or advantages neverbefore known in the art.

Thus, the strength of the threaded fastener produced equals or exceeds that obtained in other known fasteners formed with comparable threads and from comparable material. The thread profile provided by roll-tapped threads formed in an extruded sleeve has 30% additional strength as compared with similar threads cut in comparable metal material.

When a bolt or other threaded member is engaged with the threaded sleeve 57, for example a bolt 100 (FIG. 23) securing the product 2 to a member 101 with a predetermined amount of torque-tension loading, the threaded sleeve 57 is self-locking at the threaded connection with respect to the bolt. That is to say, tension on the bolt acting in the direction of the arrow 102 tends to pull the threaded sleeve 57 at its open or free end, inward and into the sleeve opening, as indicated by arrows 103 in FIG. 23. Such self-locking is accompanied by some distortion of the sleeve. However, the self-locking feature may eliminate the necessity for lockwashers and the like for the bolted connection.

Another characteristic of the threaded fastener is that after a bolted connection has been made which is self-locking after establishing a predetermined torque-tension loading, upon release of bolt 100, the thread profile in sleeve 57 returns from distorted to original state or position. That is to say, the threaded sleeve does not yield so that it takes a permanent set.

Because among other reasons of the additional strength of the thread profile of roll-tapped threads in the extruded sleeve and of additional strength and hardness imparted to the sleeve and thread metal, resulting from the cold working to form the sleeve and threads, the new threaded fastener can withstand torque-tension loading substantially greater than prior types of threaded fasteners, of the order of 100 or more as compared with 65 to 70. Failure of threaded connections loaded to destruction invariably involves stripping of the bolt threads rather than failure of the sleeve threads.

The inner and outer diameters of the extruded sleeve can be maintained within very close tolerances and substantially absolute concentricity can be provided. This means that the resultant threaded fasteners will have more uniform strength and performance from piece to piece.

Since the free end of the extruded sleeve is free of cracks or fractures, the sleeve may be threaded without cracking or failure and the threads, though normally provided internally of the extruded sleeve can be formed externally, if desired.

The thread profile of threads formed in accordance with the invention in the extruded sleeve can be maintained in excess of 75% of full thread profile.

The rearward extrusion of metal in forwardly extruded sleeve 57 to produce sleeve 78 (FIGS. 8, 9, 20 and 21) by operations shown in FIGS. 8 and 9 in addition to establishing an exact length for sleeve 78 and to providing metal in "set" condition, also strengthens the entire sleeve from the cold working pressure to which the metal in the entire sleeve is subjected. Consider first, the coining of metal by punch shoulder 54 at chamfer 59 at the conclusion of the forward cold extrusion operation (FIG. 7). This increases the sleeve length somewhat and sets the metal so that there is no spring-back distortion when the extruded part is removed from the dies. Equally important is the increased strength or hardness imparted to the metal by the coining pressure in the metal zone at and adjacent chamfer 59. Such increased strength may be greater in this zone than in other portions of the extruded sleeve 57.

Now, when sleeve 57 is rearwardly extruded as in FIGS. 8 or 9 to size the sleeve length, the entire surface of sleeve 78 is subjected by the contacting punch and die surfaces to squeezing pressure which displaces or extrudes the sleeve metal rearwardly. This cold works the metal throughout the sleeve and hardens the metal particularly at all sleeve surfaces. Such cold working and hardening thus extend the increased strength of the sleeve metal in the zone of chamfer 59 of sleeve 58 throughout the entire rearwardly extruded sleeve 78.

A desired number of roll-tapped threads may be formed in the cold extruded products manufactured in accordance with the new procedures of the invention because the tubular sleeve cold extruded integrally from the plate metal blank may have uniform sleeve wall thickness approaching one-half the plate blank thickness and may have a length projecting from the plate metal in excess of the plate blank thickness. That is, in the example given, the projecting length of the sleeve may be from 0.238" to 0.278" which is considerably greater than the 0.1719" thickness of the 8 gauge material in which the sleeve is formed. The complete internal length of the sleeve is from 0.410" to 0.450" thereby providing a sufficient length in which from five to six threads may be formed of a thread profile for 14 threads per inch with $\frac{7}{16}$" threads. The sleeve thickness in the example given is 0.072" which is nearly one-half the thickness of 8 gauge material.

Furthermore, the improved integral threaded sleeve may be formed in very thin sheet metal as illustrated in FIG. 24, such as in sheet metal 0.032" thick, wherein thread formations and thread profiles in the sleeve are provided which could not be formed in any other known manner in products made from such light gauge sheet metal.

Although the valve 68 has been indicated as being a bleeder or relief valve, it may be constructed and operated as a dumping valve to exhaust the hydraulic system at any instant or particular time when cushioning pressure is not desired.

Accordingly, the present invention in addition to providing new products having the many new properties and characteristics and combination of properties and characteristics described also provides new procedures for extruding tubular sleeves integrally from heavy gauge metal wherein sleeve cracking, sleeve length limitation because of cracking, and sleeve length limitation because of size of sleeve opening are voided; wherein close inner and outer sleeve diameter size tolerances may be maintained and absolute inner and outer sleeve diameter concentricity achieved; wherein sleeves are formed by cold extrusion procedures that may be threaded internally and externally with a substantial number of complete threads without metal loss; wherein threaded fasteners may be formed integrally in sheet metal stampings constituting components of composite metal-rubber products which may be incorporated in the stamped components by stamping operations otherwise used in the manufacture of such components; wherein warpage of the fastener threaded portion after threading is eliminated; wherein the threaded sleeve has self-locking properties when engaged with a threaded member under predetermined torque-tension loading without yielding such that the metal takes a permanent set as a result of such loading; and wherein the new procedures and products eliminate difficulties heretofore encountered in the art, avoid problems and satisfy needs existing in the art, and achieve the stated objects in a simple, effective and inexpensive manner.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention and of the new procedures and products are by way of example and the scope of the invention is not limited to the exact details, sizes, etc. described because various products may be manufactured by the fundamental procedures of the invention without departing from the fundamental principles set forth.

Although the terms "sheet metal" and "plate metal" are used herein, when referring to light and heavy gauge material, nevertheless since the invention is applicable to the manufacture of products from either sheet or plate metal, it is to be understood that the terms "sheet metal" and "plate metal" are used more or less synonymously.

Having now described the features, discoveries and principles of the invention, the manner in which the new procedures are carried out, the characteristics of the new products produced, and the advantageous, new and useful results obtained thereby; the new and useful methods, steps, procedures, treatments, discoveries and principles, and mechanical equivalents obvious to those skilled in the art are set forth in the appended claims.

Certain cold worked metal blanks, cold worked steel products, integral threaded fastener sleeves, and composite molded metal-rubber products disclosed but not claimed herein are claimed in my co-pending application SN 419,-634, filed Dec. 21, 1964.

I claim:
1. The method of making a composite molded metal-rubber product, including the steps of cold extruding a tubular sleeve integrally from a sheet steel blank having a projecting length greater than the blank thickness and a uniform sleeve wall thickness approximating one-half the thickness of the blank and a length approximately equal to the internal sleeve diameter; molding the blank having the integral cold extruded sleeve with rubber to form a composite metal-rubber product; then drilling the internal sleeve surface to remove rubber flashing and a thin skin of work hardened metal from said internal sleeve surface and to form a clean metal surface having a predetermined diameter; and then roll-tapping threads by metal displacement in the drilled clean internal sleeve surface without metal loss.

2. The method of making a composite molded metal-rubber product, including the steps of cold extruding a tubular sleeve integrally from a sheet steel blank; molding the blank with rubber to form a composite metal-rubber product; then drilling the internal extruded sleeve surface to clean the same and remove work hardened metal therefrom; and then roll-tapping threads by metal displacement in the drilled internal sleeve surface without metal loss.

3. The method of making a composite molded metal-rubber product, including the steps of forming a hole through a sheet steel blank; forwardly extruding blank metal surrounding the hole by pressure applied flatwise at an annular zone surrounding the upper end of the hole to form a sleeve; confining the blank metal from within the hole during such forward extrusion; yieldingly pressure supporting the extruded metal to hold the same under pressure throughout extrusion of said sleeve; increasing the pressure support during extrusion; then removing the pressure support; then applying further extrusion pressure annularly outwardly downwardly at an angle at the intersection of the upper end of the sleeve inner surface and the top of the blank to form and coin a frusto-conical-shaped shoulder at said upper end, to bodily move sleeve metal downward from said shoulder to increase the sleeve length, and to set the cold-worked metal in the extruded sleeve; molding the blank with rubber to form a composite metal-rubber product; then drilling a thin skin of work hardened metal from the interior of the sleeve; and then roll-tapping threads by displacing metal in the drilled interior of the sleeve without metal loss.

4. The method of making a composite molded metal-rubber product, including the steps of piercing a sheet steel blank to form a pierced hole having a diameter from less than up to equal to the thickness of the blank; shaving the interior surface of the pierced hole to remove piercing breakout formation and to form a shaved hole cylindrical throughout its length; laterally confining blank metal internally of the shaved hole; yieldingly pressure supporting blank metal in an annular zone immediately surrounding the lower end of the hole; applying downward axial compression flatwise to the blank metal at an annular zone immediately surrounding the upper end of the hole and against the yieldingly supported blank metal to displace metal confined under compression from the blank and surrounding the hole downwardly and around the flatwise applied pressure to form an extruded sleeve having uniform diameter concentric inner and outer surfaces; piloting the flatwise applied compression throughout downward metal displacement by the lateral confinement of the blank metal internally of the shaved hole; molding the blank with rubber to form a composite metal-rubber product; then drilling the internal extruded sleeve surface to clean the same and remove work hardened metal therefrom; and then roll-tapping threads by metal displacement in the drilled internal sleeve surface without metal loss.

5. The method of making a composite molded metal-rubber product having a threaded fastener projecting a predetermined distance integrally from a metal component of the product, including the steps of piercing a sheet steel blank to form a pierced hole; shaving breakout formation from the interior of the pierced hole to form a cylindrical shaved hole; forwardly cold extruding laterally confined blank metal surrounding the shaved hole by pressure applied flatwise at an annular zone surrounding the upper end of the shaved hole to form a sleeve; yieldingly supporting the laterally confined blank metal to hold the same under pressure during forward extrusion of said sleeve; then removing the yielding support and further forwardly extruding the sleeve by pressure applied annularly outwardly downwardly at an angle at the upper end of the extruded sleeve metal to form and coin an angular shoulder at said upper end and to increase the sleeve length; then rearwardly cold extruding the sleeve metal to form a predetermined sleeve length; then molding the blank with rubber to form a composite metal-rubber product; then drilling the internal extruded sleeve surface to predetermined diameter and to remove work hardened metal and relieve stresses therefrom; and then cold roll-tap forming threads having a pitch diameter equal to said predetermined drilled sleeve diameter in the stress relieved internal sleeve surface by metal displacement without metal loss to complete the formation of the integral threaded fastener.

6. In a method of forming a tubular sleeve having uniform diameter concentric inner and outer surfaces and an open end projecting integrally from a sheet metal blank having top and bottom surfaces, the steps of forming a hole cylindrical throughout its length through a sheet steel blank, laterally confining blank metal internally of the hole, yieldingly axially pressure supporting blank metal at the bottom blank surface in an annular zone immediately surrounding the lower end of the hole, flatwise axially pressing the blank metal at the top blank surface in an annular zone immediately surrounding the upper end of the hole downwardly against the yieldingly supported metal to forwardly extrude metal in the blank downwardly; and laterally exteriorly confining the metal displaced during extrusion thereby holding under compression between the lateral internal and external confinement and between the axially applied pressure and pressure support, the blank metal displaced throughout extrusion metal flow, to thereby form a sleeve having inner and outer concentric surfaces whose diameters are defined respectively by said internal and external confinement.

7. The method defined in claim 6 in which the confining pressure on the blank metal being displaced which holds such metal under compression is increased throughout extrusion metal flow.

8. The method defined in claim 6 in which the yielding pressure support of extruded metal is removed when a sleeve of predetermined length has been extruded, and in which the sleeve is subjected to further extrusion pressure applied annularly outwardly downwardly at an angle at the intersection of the upper end of the sleeve inner surface and the top of the blank to form and coin a frusto-conical-shaped shoulder at said upper end, to bodily move sleeve metal downward from said shoulder to increase the sleeve length, and to set the cold worked metal in the extruded sleeve.

9. The method defined in claim 6 in which the flatwise axial pressing of the blank metal under confined compression throughout extrusion flow of the metal forms a chamfered corner at the open end of the sleeve.

10. The method defined in claim 6 in which the forming of a hole cylindrical throughout its length through the sheet metal blank, includes the steps of piercing the blank to form a pierced hole, and then shaving the interior surface of the pierced hole to remove piercing breakout formation and to form the shaved hole to truly cylindrical shape throughout its length.

11. The method of forming a threaded tubular sleeve having an open end projecting integrally from a sheet steel blank having top and bottom surfaces, including the steps of forming a hole cylindrical throughout its length through a sheet steel blank, laterally confining blank metal internally of the hole, yieldingly axially pressure supporting the blank metal at the bottom blank surface in an annular zone immediately surrounding the lower end of the hole, flatwise axially pressing the blank metal at the top blank surface in an annular zone immediately surrounding the upper end of the hole downwardly against the yieldingly supported metal to forwardly extrude metal in the blank downwardly; laterally exteriorly confining the metal displaced during extrusion thereby holding under compression between the lateral internal and external confinement and between the axially applied pressure and pressure support, the blank metal displaced throughout extrusion metal flow, to form a sleeve having a uniform sleeve wall thickness with inner and outer concentric surfaces; removing a thin skin of work-hardened metal throughout the interior surface of the extruded sleeve; and then roll-tapping threads by displacing metal without metal loss throughout the length of the sleeve in the internal sleeve surface exposed by the removal of the thin skin of work-hardened metal.

12. The method of forming a threaded tubular sleeve projecting integrally from a sheet metal blank having a blank thickness of 0.1719", and in which the sleeve has uniform sleeve thickness of 0.072" prior to threading, an outer diameter of from 0.529" to 0.539", and a length of from 0.410" to 0.450", and in which the sleeve inner surface has from 5 to 6 threads having the thread profile of $\frac{7}{16}$"—14 threads per inch threads; including the steps of forming a hole cylindrical throughout its length through a sheet metal blank, laterally confining blank metal internally of the hole, yieldingly axially pressure supporting the blank metal at the bottom blank surface in an annular zone immediately surrounding the lower end of the hole, flatwise axially pressing the blank metal at the top blank surface in an annular zone immediately surrounding the upper end of the hole downwardly against the yieldingly supported metal to forwardly extrude metal in the blank downwardly; laterally exteriorly confining the metal displaced during extrusion thereby holding under compression between the lateral internal and external confinement and between the axially applied pressure and pressure support, the blank metal displaced throughout extrusion metal flow, to form a sleeve having inner and outer concentric surfaces with a chamfered open end; removing the pressure support of the sleeve, applying further extrusion pressure annularly outwardly downwardly at an angle at the intersection of the upper end of the sleeve inner surface and the top of the blank to form and coin a frusto-conical-shaped shoulder at said upper end, to bodily move sleeve metal downward from said shoulder to increase the sleeve length, and to set the cold-worked metal in the extruded sleeve; drilling a thin skin of work-hardened metal throughout the internal surface of the extruded tubular sleeve, and then roll-tapping threads by displacing metal without metal loss in the drilled surface of the tubular sleeve.

References Cited

UNITED STATES PATENTS

| | | | |
|---|---|---|---|
| RE 23,939 | 2/1955 | Keller et al. | 72—354 |
| 2,157,354 | 5/1939 | Sherman | 72—379 |
| 2,373,901 | 5/1945 | Lowery | 72—335 |
| 2,701,018 | 2/1955 | Glitsch | 72—347 |
| 2,738,574 | 3/1956 | Riggs | 72—377 |
| 3,050,849 | 8/1962 | Elchison et al. | 72—348 |
| 3,078,905 | 2/1963 | Somers et al. | 72—370 |
| 3,276,115 | 10/1966 | Hansz | 29—527 |

RICHARD J. HERBST, *Primary Examiner.*

L. A. LARSON, *Assistant Examiner.*